US009805515B2

United States Patent
Sugaya

(10) Patent No.: US 9,805,515 B2
(45) Date of Patent: Oct. 31, 2017

(54) SYSTEM AND METHOD FOR AUGMENTED REALITY

(71) Applicant: OPTiM Corporation, Saga (JP)

(72) Inventor: Shunji Sugaya, Tokyo (JP)

(73) Assignee: OPTiM Corporation, Saga-shi (JP)

( * ) Notice: Subject to any disclaimer, the term of this patent is extended or adjusted under 35 U.S.C. 154(b) by 0 days.

(21) Appl. No.: 15/157,541

(22) Filed: May 18, 2016

(65) Prior Publication Data

US 2017/0032574 A1    Feb. 2, 2017

(30) Foreign Application Priority Data

Jul. 30, 2015   (JP) .................................. 2015-150651

(51) Int. Cl.
*G06T 15/00*    (2011.01)
*G06T 19/00*    (2011.01)
*H04L 29/08*    (2006.01)

(52) U.S. Cl.
CPC ............ *G06T 19/006* (2013.01); *H04L 67/12* (2013.01); *G06T 2210/04* (2013.01)

(58) Field of Classification Search
CPC .... G06T 19/006; G06T 2210/04; H04L 67/12
USPC ........................................................ 345/419
See application file for complete search history.

(56) References Cited

U.S. PATENT DOCUMENTS 9,407,815 B2 * 8/2016 Bostick .............. H04N 5/23222
9,438,806 B2 * 9/2016 Nonaka .............. H04N 1/00244
9,613,455 B1 * 4/2017 Nelson .................... G06T 17/05
9,667,860 B2 * 5/2017 Hakim ............... H04N 5/23222

FOREIGN PATENT DOCUMENTS

JP       2014-115957      6/2014

OTHER PUBLICATIONS

Taketomi, Takafumi, et al. "Camera pose estimation under dynamic intrinsic parameter change for augmented reality." Computers & Graphics 44 (2014): 11-19.*
Translation of JP 2014-115957, Sep. 2017, pp. 1-10.*

* cited by examiner

*Primary Examiner* — Phu K Nguyen
(74) *Attorney, Agent, or Firm* — Lex IP Meister, PLLC

(57) ABSTRACT

Not only to display augmented reality from an imaging location but also to specify the location desired to be checked for the displayed three-dimensional data and present the location from which an image should be taken. The system and a method for augmented reality includes a photographer terminal that displays augmented reality when taking an image and an augmented reality server that includes a location matching database, in which the photographer terminal detects and transmits location information and a direction when taking an image to the augmented reality server; receives and displays three-dimensional data on a building from the augmented reality server and then receives instruction as to a predetermined location desired to display augmented reality integrating the displayed data; and outputs direction data on the location and the direction of a camera that are calculated by the augmented reality server under the instruction to the photographer terminal.

3 Claims, 16 Drawing Sheets

Fig. 4

| Imaged date and time | Latitude | Longitude | Direction (true bearing) | Altitude (ordnance datum) |
|---|---|---|---|---|
| 2015/7/7 10:20:30 | 35° 40'13.4"N | 139° 44'49.2"E | 45.25 | 5.5 |

Fig. 5

| No. | Identifier | CAD files stored location | Type of the CAD | Three-dimensional data stored location | Latitude | Longitude | Direction (true bearing) |
|---|---|---|---|---|---|---|---|
| 1 | Mr. Suzuki's residence | root¥cad¥suzuki¥ | Jw_cad | root¥3d¥suzuki¥ | 35° 40'16.4"N | 139° 44'43.7"E | 359.99 |
| 2 | Mr. Sato's residence | root¥cad¥sato¥ | AutoCAD | root¥3d¥sato¥ | 31° 54'39.8"N | 131° 25'38.9"E | 183.25 |
| 3 | Convenience store X | - | - | root¥3d¥storeX¥ | 31° 54'41.7"N | 131° 25'25.8"E | 120.27 |
| 4 | Hospital Y | root¥cad¥hospitalY¥ | VectorWorks | root¥3d¥hospitalY¥ | 31° 33'37.1"N | 130° 33'28.7"E | 162.18 |
| 5 | Model House TypeA | root¥cad¥houseA¥ | AutoCAD | root¥3d¥houseA¥ | - | - | - |
| 6 | Model House TypeB | root¥cad¥houseB¥ | AutoCAD | root¥3d¥houseB¥ | - | - | - |
| 7 | Model House TypeC | root¥cad¥houseC¥ | AutoCAD | root¥3d¥houseC¥ | - | - | - |
| 8 | | | | | | | |
| 9 | | | | | | | |
| 10 | | | | | | | |

Fig. 9

| Generation date and time | Latitude | Longitude | Imaging direction (True bearing) | Altitude (Ordnance datum) |
|---|---|---|---|---|
| 2015/7/7 10:22:33 | 35° 40'14.2"N | 139° 44'49.2"E | 0 | 5.5 |

Fig. 10

| Generation date and time | East (m) | West (m) | South (m) | North (m) | Imaging direction | Difference in altitude (m) |
|---|---|---|---|---|---|---|
| 2015/7/7 10:22:33 | 12.0 | — | — | 5.0 | North | 0.0 |

Direction display 1

If you want to superimpose augmented reality data from the viewpoint indicated by the arrow, please move 5 m to the north and 12 m to the east Please turn the camera to the north to take an image. 

END NAVIGATION

Move 6 m to the north and 5 m to the east

Direction display 2

If you want to superimpose augmented reality data from the viewpoint indicated by the arrow, please move 1 m to the south and 5 m to the east.

Please turn the camera to the north to take an image. 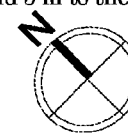

END NAVIGATION

Move 1 m to the south and 5 m to the east

Direction display 3

If you want to superimpose augmented reality data from the viewpoint indicated by the arrow, please take an image from this location.

Please turn the camera to the north. 

END NAVIGATION

Rotate to the north at this same location

Direction display 4

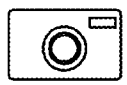 Please take an image

If you want to superimpose augmented reality data from the viewpoint of the arrow, please take an image from this location with turning the camera to the north. 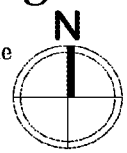

IMAGE   CANCEL

Fig. 16

SYSTEM AND METHOD FOR AUGMENTED REALITY

CROSS REFERENCE TO RELATED APPLICATIONS

This application claims priority to Japanese Patent Application No. 2015-150651 filed on Jul. 30, 2015, the entire contents of which are incorporated by reference herein.

TECHNICAL FIELD

The present invention relates to a system for augmented reality that displays augmented reality integrating three-dimensional data of the planned building when the planned construction site is imaged, and presents direction data on and from which an image should be taken in the real world to a user by input of a location at which the user desires to check the three-dimensional data.

BACKGROUND ART

In recent years, augmented reality (herein referred to as "AR") has commonly been used as a technology to augment a real environment perceived by a person with a computer. There are various means to augment reality with a computer, such as seeing, hearing, and touching. For example, navigation systems and services to explain a location and an object in text and voice have been implemented.

The augmented reality building simulator displaying a building to be completed in a planned construction site where the building has not constructed yet, by taking advantages of this augmented reality in the architecture field, is proposed (Patent Document 1).

CITATION LIST

Patent Literature

Patent Document 1: JP 2014-115957 A

SUMMARY OF INVENTION

However, by the method of Patent Document 1, the augmented reality superimposes and displays three-dimensional building data on the surrounding landscape only from the direction to which a camera faces. This does not enable the building to be seen from other locations and angles. If desiring to see the back doors, the rest rooms, and the building from a particular angle, the user should take images from the desired locations. However, the user hardly knows the actual location and direction from which the user should take images.

Moreover, the method of Patent Document 1 can display augmented reality integrating the appearance of a building but cannot display the outside seen from the inside of the building, for example, the landscape seen from a living room window.

In view of these problems, an objective of the present invention is to provide a system and a method for augmented reality, the system including a photographer terminal that displays augmented reality when taking an image and an augmented reality server that includes a location matching database, in which the photographer terminal detects and transmits location information and a direction when taking an image to the augmented reality server; receives and displays three-dimensional data on a building from the augmented reality server and then receives instruction as to a predetermined location desired to display augmented reality integrating the displayed data; and outputs direction data on the location and the direction of a camera that are calculated by the augmented reality server under the instruction to the photographer terminal.

The first aspect of the present invention provides a system for augmented reality including a photographer terminal that displays augmented reality when taking an image and an augmented reality server being communicatively connected with the photographer terminal, in which the photographer terminal includes:
a location and direction data generation unit that detects current location information and a current direction and generates location data and direction data;
a location and direction data transmitting unit that transmits the generated location data and direction data to the augmented reality server;
a three-dimensional data receiving unit that receives three-dimensional data from the augmented reality server;
a three-dimensional data display unit that displays the three-dimensional data;
an instruction data input unit that receives an input of instruction data on a location and a direction to the displayed three-dimensional data from a user; and
an instruction data transmitting unit that transmits the received instruction data to the augmented reality server, and the augmented reality server includes:
a three-dimensional data transmitting unit that transmits the three-dimensional data in response to a request from the photographer terminal;
a location and direction data receiving unit that receives the location data and the direction data from the photographer terminal;
a location matching database that associates and stores the three-dimensional data with an actual location;
an instruction data receiving unit that receives the instruction data from the photographer terminal; and
a direction data transmitting unit that transmits direction data on the location and the direction of a camera to display augmented reality from the location and the direction contained in the instruction data received from the photographer terminal, based on the instruction data, the location matching database, and the location data and the direction data of the photographer terminal.

According to the first aspect of the present invention, a system for augmented reality includes a photographer terminal that displays augmented reality when taking an image and an augmented reality server being communicatively connected with the photographer terminal, in which the photographer terminal includes:
a location and direction data generation unit that detects current location information and a current direction and generates location data and direction data;
a location and direction data transmitting unit that transmits the generated location data and direction data to the augmented reality server;
a three-dimensional data receiving unit that receives three-dimensional data from the augmented reality server;
a three-dimensional data display unit that displays the three-dimensional data;

an instruction data input unit that receives an input of instruction data on a location and a direction to the displayed three-dimensional data from a user; and an instruction data transmitting unit that transmits the received instruction data to the augmented reality server, and the augmented reality server includes:

a three-dimensional data transmitting unit that transmits the three-dimensional data in response to a request from the photographer terminal;

a location and direction data receiving unit that receives the location data and the direction data from the photographer terminal;

a location matching database that associates and stores the three-dimensional data with an actual location;

an instruction data receiving unit that receives the instruction data from the photographer terminal; and a direction data transmitting unit that transmits direction data on the location and the direction of a camera to display augmented reality from the location and the direction contained in the instruction data received from the photographer terminal, based on the instruction data, the location matching database, and the location data and the direction data of the photographer terminal.

The second aspect of the present invention provides the system according to the first aspect of the present invention, in which the photographer terminal further includes a direction data display unit that receives and displays the direction data transmitted from the direction data transmitting unit.

According to the second aspect of the present invention, in the system according to the first aspect of the present invention, the photographer terminal further includes a direction data display unit that receives and displays the direction data transmitted from the direction data transmitting unit.

The third aspect of the present invention provides a method for augmented reality that is executed by a system including a photographer terminal that displays augmented reality when taking an image and an augmented reality server that includes a location matching database that associates and stores the three-dimensional data with an actual location, the augmented reality server being communicatively connected with the photographer terminal, the method including the steps, executed by the photographer terminal, of:

detecting current location information and a current direction and generating location data and direction data;

transmitting the generated location data and direction data to the augmented reality server;

receiving three-dimensional data from the augmented reality server;

displaying the three-dimensional data;

receiving an input of instruction data on a location and a direction to the displayed three-dimensional data from a user; and transmitting the received instruction data to the augmented reality server, and the steps, executed by the augmented reality server, of:

transmitting the three-dimensional data in response to a request from the photographer terminal;

receiving the location data and the direction data from the photographer terminal;

receiving the instruction data from the photographer terminal; and transmitting direction data on the location and the direction of a camera to display augmented reality from the location and the direction contained in the instruction data received from the photographer terminal, based on the instruction data, the location matching database, and the location data and the direction data of the photographer terminal.

The present invention can provide a system and a method for augmented reality, the system including a photographer terminal that displays augmented reality when taking an image and an augmented reality server that includes a location matching database, in which the photographer terminal detects and transmits location information and a direction when taking an image to the augmented reality server; receives and displays three-dimensional data on a building from the augmented reality server and then receives instruction as to a predetermined location desired to display augmented reality integrating the displayed data; and outputs direction data on the location and the direction of a camera that are calculated by the augmented reality server under the instruction to the photographer terminal.

BRIEF DESCRIPTION OF DRAWINGS

FIG. 4 shows one example of location and direction data.

FIG. 5 shows one example of data stored in the location matching database 2410.

FIG. 9 shows one example of the direction data.

FIG. 10 shows another example of the direction data.

FIG. 16 shows one example of the display on the photographer terminal 1000 that is moved to an imaging location according to the navigation.

DESCRIPTION OF EMBODIMENTS

Embodiments of the present invention will be described below with reference to the attached drawings. However, this is illustrative only, and the technological scope of the present invention is not limited thereto.

Overview of System for Augmented Reality

Figure 1:
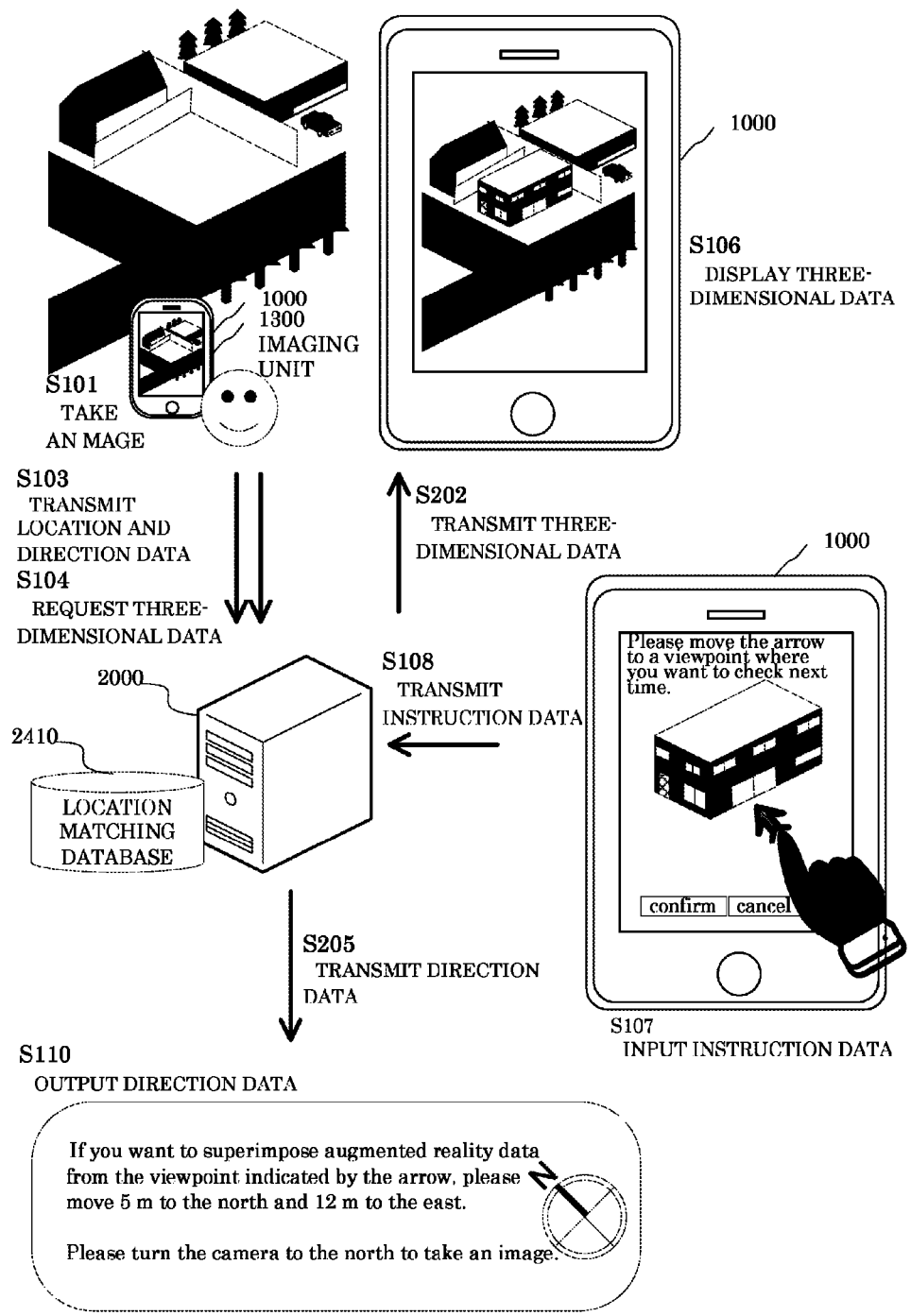
FIG. 1 shows a schematic diagram of the system for augmented reality according to a preferable embodiment of the present invention.

FIG. 1 shows a schematic diagram of the system for augmented reality according to a preferable embodiment of the present invention. The overview of the system for augmented reality will be described below with reference to FIG. 1.

Figure 2:
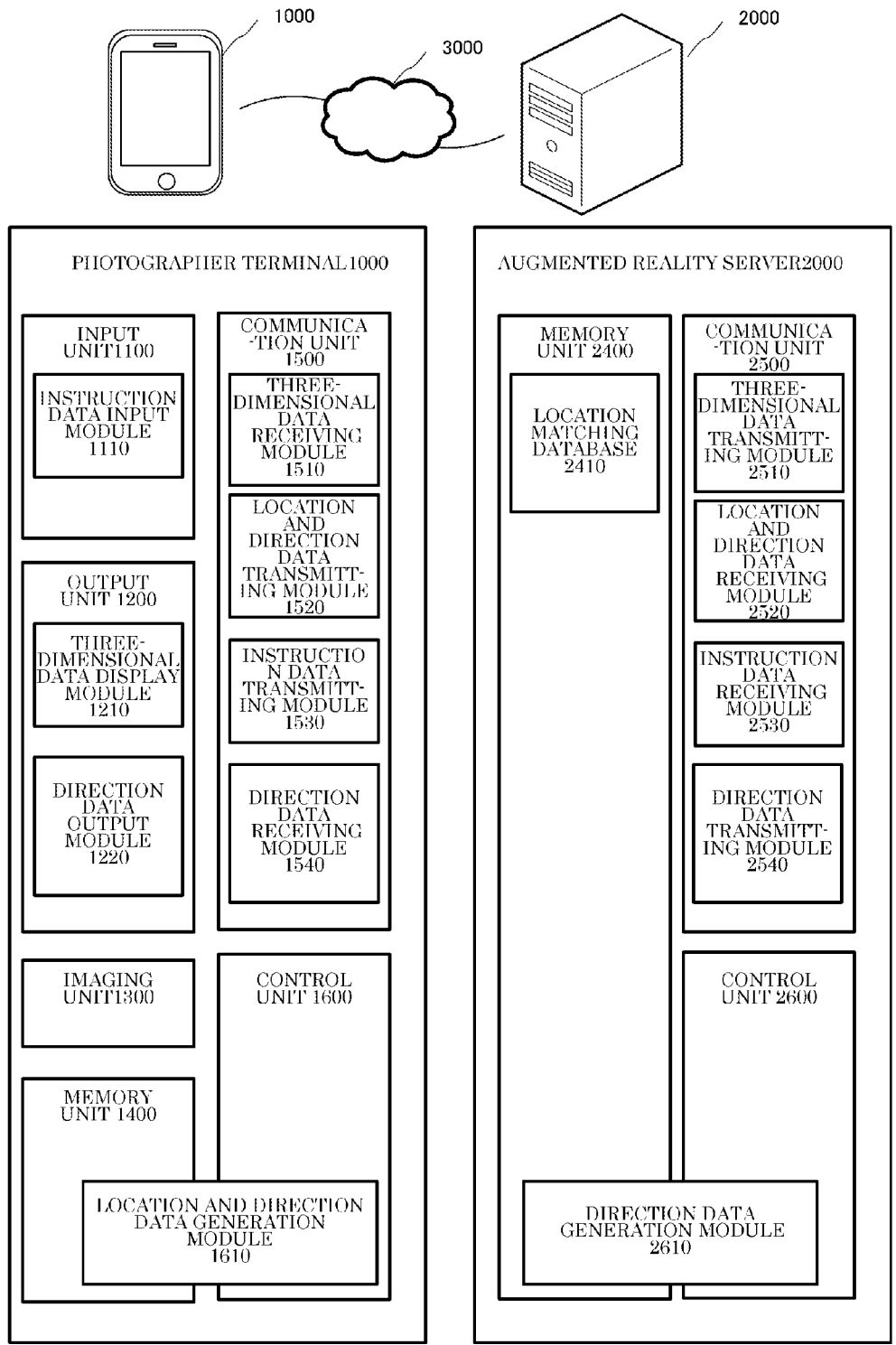
FIG. 2 shows a functional block diagram of the photographer terminal 1000 and the augmented reality server 2000 to illustrate the relationship among the functions.

The photographer terminal 1000 includes an input unit 1100, an output unit 1200, an imaging unit 1300, a memory unit 1400, a communication unit 1500, and a control unit 1600 as shown in FIG. 2. The augmented reality server 2000 includes a memory unit 2400, a communication unit 2500, and a control unit 2600. The memory unit 2400 includes a location matching database 2410. The photographer terminal 1000 is connected with the augmented reality server 2000 through a public line network 3000.

The photographer terminal 1000 may be a smart phone, a tablet PC, a digital camera, a wearable device, a security camera, or a general information appliance such as a PC provided with a camera function. The smart phone shown as the photographer terminal 1000 in the attached drawings is just one example.

The imaging unit 1300 is a camera. The images that this image unit 1300 takes can be converted into digital data and stored in the memory unit 1400 and displayed on the output unit 1200. The image may be a still image or a moving image. If the image is a moving image, the control unit 1600 can capture a part of the moving image to store in the memory unit 1400 as a still image. The obtained taken image is an accurate image with information as much as the system needs for augmented reality.

The server 2000 may be a general one provided with the direction data generation function to be described later.

First, a user images a landscape including a planned construction site for a building by using the imaging unit 1300 of the photographer terminal 1000 (step S101). At this time, the photographer terminal 1000 executes an augmented reality program to display the three-dimensional data of a building to be completed in a planned construction site where the building has not constructed yet. When executing the program, the photographer terminal 1000 is communicative with the augmented reality server 2000.

The control unit 1600 detects the location and the direction of the photographer terminal 1000 when an image is taken and generates the location and direction data. The location and the direction are detected with a global positioning system (hereinafter referred to as "GPS") function, an electronic compass, an acceleration sensor, etc., of the photographer terminal 1000.

FIG. 4 shows one example of the location and direction data. The data on the location and the direction such as the latitude, the longitude, the direction, and then the altitude is associated and generated with an imaged date and time. The data format of the latitude, the longitude, the direction, and the altitude may be adjusted to a GPS log data standard or the digital still camera image file format standard (Exif) and only has to be adjusted depending on the system. In FIG. 4, the direction and the altitude are based on true bearing and ordnance datum, respectively. However, the present invention is not limited to this in particular. The direction and the altitude only have to use a standard appropriate for the system.

When the photographer terminal 1000 has a six-axis sensor, etc., unlike FIG. 4, to detect not only the north, south, east, and west directions but also an inclination to the horizontal direction, the location and direction data may include the inclination. The inclination can generate more suitable direction data if the building is desired to be imaged from the bottom.

Then, the photographer terminal 1000 transmits the location and direction data generated by the control unit 1600 to the augmented reality server 2000 through the communication unit 1500 (step S103).

The photographer terminal 1000 also requests the three-dimensional data from the augmented reality server 2000 (step S104).

If receiving a request for the three-dimensional data, the augmented reality server 2000 references the location matching database 2410 of the memory unit 2400 based on the received location and direction data and transmits the three-dimensional data on the building to the photographer terminal 1000 (step S202).

The location matching database 2410 associates and stores the three-dimensional data and the actual location of the building. FIG. 5 shows one example of data stored in the location matching database 2410. The data include the name of the building, drawing data such as CAD files, the type of the CAD, three-dimensional data necessary for augmented reality, the latitude and the longitude of the planned construction site for the building, and the direction of the front of the building. The altitude is not shown in FIG. 5 but may be included in the data.

The drawing data such as CAD files or the type of CAD are not always needed. Three-dimensional data on the building that are necessary for augmented reality are only needed.

If not detecting the three-dimensional data on the building by using the received location and direction data, the augmented reality server 2000 may notify this to the photographer terminal 1000, and then the output unit 1200 of the photographer terminal 1000 may display that the building is not found, as an error.

Alternatively, the augmented reality server 2000 may transmit data on building names, etc., to the photographer terminal 1000, and then the output unit 1200 may output the data to allow a user to select a building desired to be displayed.

Still alternatively, the augmented reality server 2000 may transmit three-dimensional data on a building such as a model house whose actual location data are not registered, a miniature version of the building, etc., to the photographer terminal 1000, and then the output unit 1200 may output the data to allow a user to select a building desired to be displayed.

In the step S202, the augmented reality server 2000 transmits not only the three-dimensional data on the building but also data on the latitude, the longitude, the direction of the front, etc., of the building, if necessary, to the photographer terminal 1000 to display augmented reality.

The photographer terminal 1000 superimposes and displays the three-dimensional data received from the augmented reality server 2000 as augmented reality on the previously imaged landscape on the output unit 1200 (step S106).

The three-dimensional data is displayed based on the data on the latitude, the longitude, the direction of the front, etc., of the building that are received together with the three-dimensional data as appropriate. The process to calculate the coordinate of each feature point based on corner points and local feature amounts in a background image, which is generally performed in markerless augmented reality, may be performed to move the three-dimensional data on the building to an appropriate location to display augmented reality. Alternatively, the user may finely adjust the display location through the input unit 1100 after the three-dimensional data is displayed on the output unit 1200 of the photographer terminal 1000. The present invention is not the limited to the augmented reality method of superposing and displaying three-dimensional data on a landscape as a background.

If desiring to further check the displayed three-dimensional data from other locations and angles, the user inputs instruction data on the location and the direction from which the user desires to view, to the three-dimensional data displayed on the output unit 1200 of the photographer terminal 1000 through the input unit 1100 (step S107).

Figure 6:
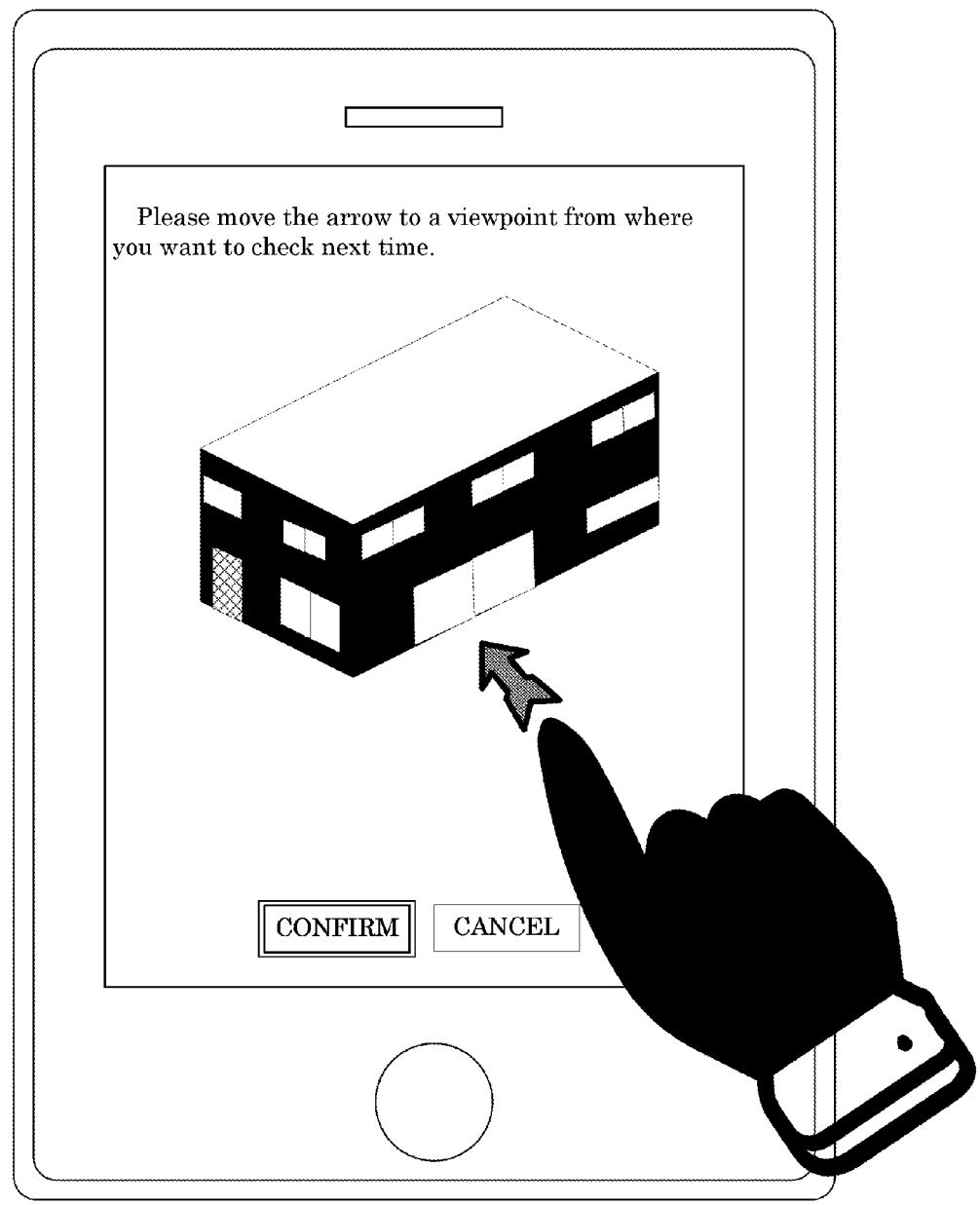
FIG. 6 shows one example of the screen to input an instruction of a location and a direction to the displayed three-dimensional data with an arrow.

FIG. 6 shows an enlarged view of the step S107 of inputting instruction data that is shown in FIG. 1. Specifically, FIG. 6 shows an example in which the user moves and turns the arrow around to input a location and an angle from which the user desires to check. In this example, only the building of three-dimensional data is displayed. However, the user may input instruction data in an augmented reality display in which the three-dimensional data is combined with the background.

Figure 7:
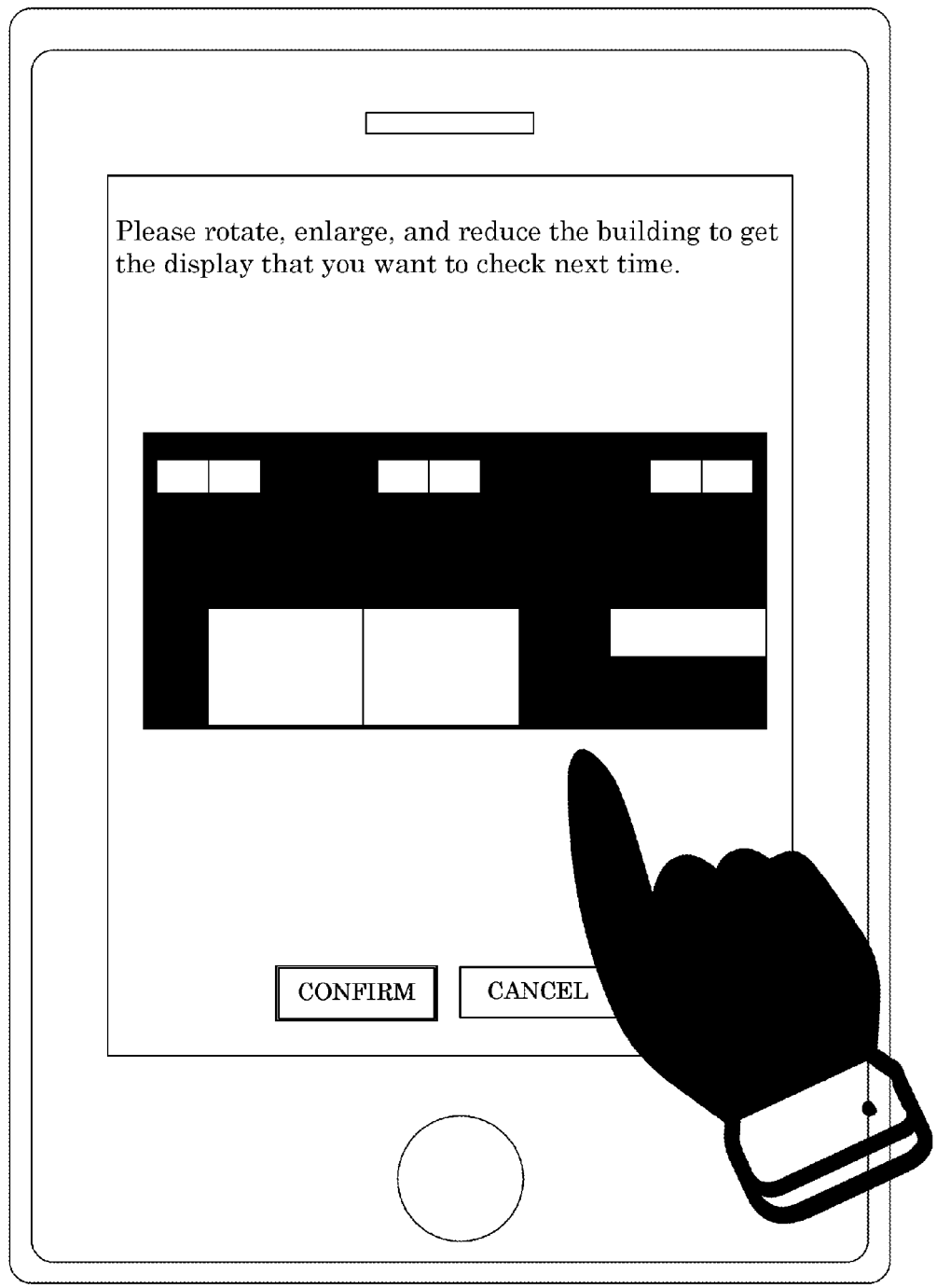
FIG. 7 shows one example of the screen to input an instruction of a location and a direction by rotating, and enlarging and reducing the displayed three-dimensional data

FIG. 7 shows an example in which the location or the angle is not specified by the arrow but the building of three-dimensional data is rotated 360 degrees, and enlarged and reduced. In this case, the location and the angle from which the building is actually viewed is instruction data.

In addition, the three-dimensional data for walk-through in a building have existed in recent years. The users may desire to know how the landscape from the inside such as a living room window of the building is. In this case, the landscape only has to be displayed in a window of the building as virtual reality. The display of three-dimensional data may be switched from the outside to the inside of the building, and then the user may specify the location and the angle that the user desires to check.

Figure 8:
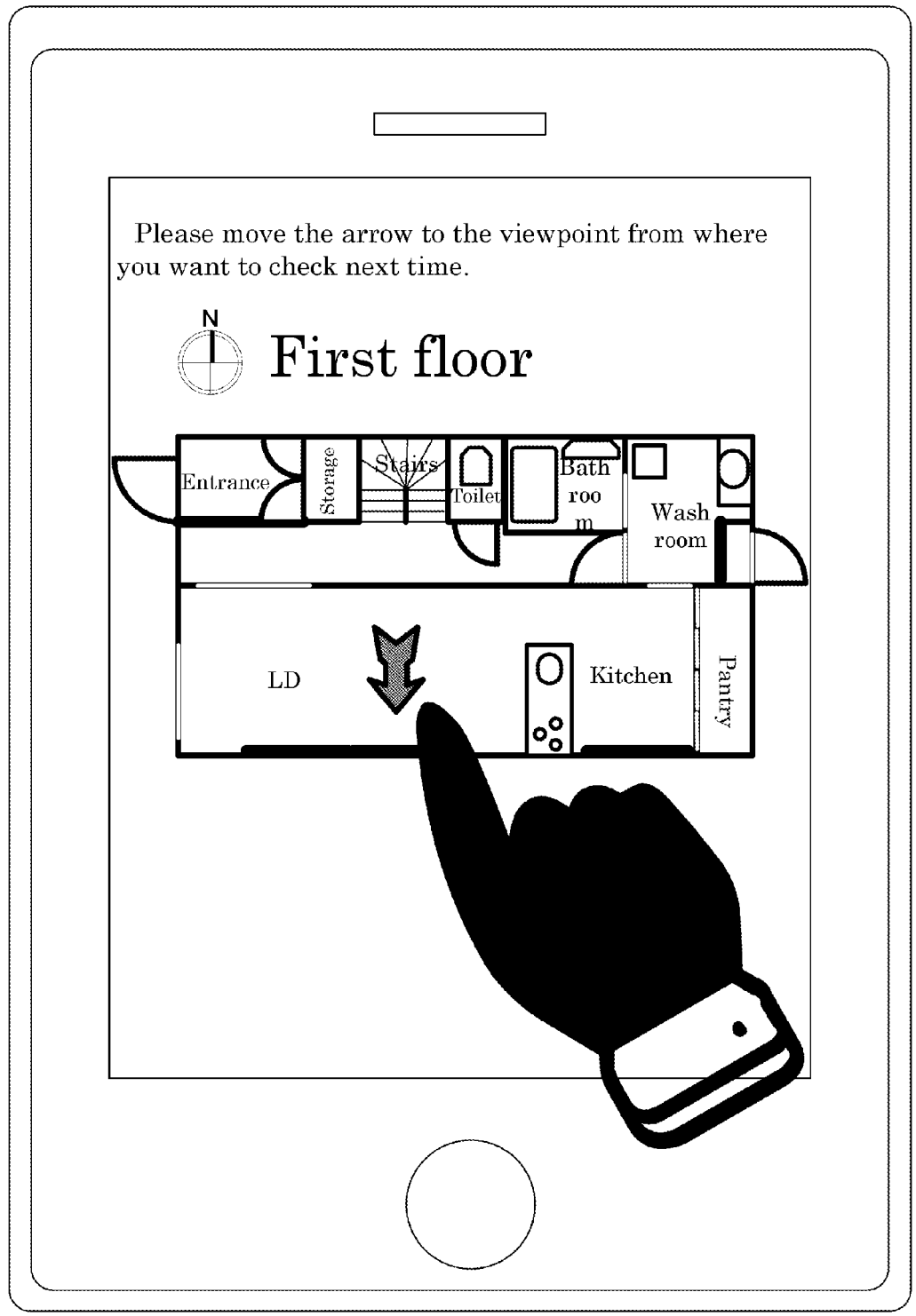
FIG. 8 shows one example of the screen to input instruction data on a location and a direction by using two-dimensional data corresponding to the displayed three-dimensional data.

If the user hardly specifies the location and the angle that the user desires to check by operating the walk-through screen of the inside of the building, the display may be switched to two-dimensional data such as a floor plan corresponding to the three-dimensional data to allow the user to specify the location and the angle like an example shown in FIG. 8. This enables the user to clearly and easily specify the viewpoint, etc., including a large window.

Then, the photographer terminal 1000 transmits the input instruction as to a location and an angle to the augmented reality server 2000 as instruction data (step S108).

The instruction data contains the location and the angle on three-dimensional data and on the two-dimensional drawing such as the floor plan, and the instructed date and time. However, the instruction data contain information, regardless of the data format, enough for the server 2000 to generate direction data.

The augmented reality server 2000 receives the instruction data, and generates and transmits direction data to the photographer terminal 1000 (step S205).

The direction data indicates the distance from the current location at which the photographer terminal 1000 takes an image to the location specified as instruction data from which an image is desired to be taken next time. The direction data may also include the direction from which an image is desired to be taken.

The augmented reality server 2000 generates direction data based on the received instruction data, the data of the location matching database 2410 stored in the memory unit 2400, and the previously received current location and direction data of the photographer terminal 1000. The latitude, the longitude, the direction, the altitude, etc., of the location at which the user desires to take an image next time can be calculated based on the instruction data, the three-dimensional data on the building, and the data on the latitude, the longitude, the direction, the altitude, etc., of the building.

FIG. 9 shows one example of the direction data transmitted from the augmented reality server 2000 to the photographer terminal 1000. This example contains the latitude, the longitude, the direction, and the altitude of the location at which an image is desired to be taken next time together with the date and time when the direction data was generated as information. In this example, the photographer terminal 1000 compares the location and direction data on the current location with the direction data to show the distance from the current location to the location from which an image is desired to be taken next time.

FIG. 10 shows another example of the direction data transmitted from the augmented reality server 2000 to the photographer terminal 1000. This example contains the respective distances from the current location to the north, south, east, and west at which and the direction and the difference in altitude from which an image is desired to be taken next time together with the date and time when the direction data was generated as information. In this example, the augmented reality server 2000 compares the location and direction data on the current location of the photographer terminal 1000 with the data on the location at which an image is desired to be taken next time to calculate the distances and the difference in altitude.

Finally, the output unit 1200 of the photographer terminal 1000 outputs the direction data indicating the distance to the location at which an image is desired to be taken next time and the direction of the camera when it takes an image (step S110).

Figure 11:
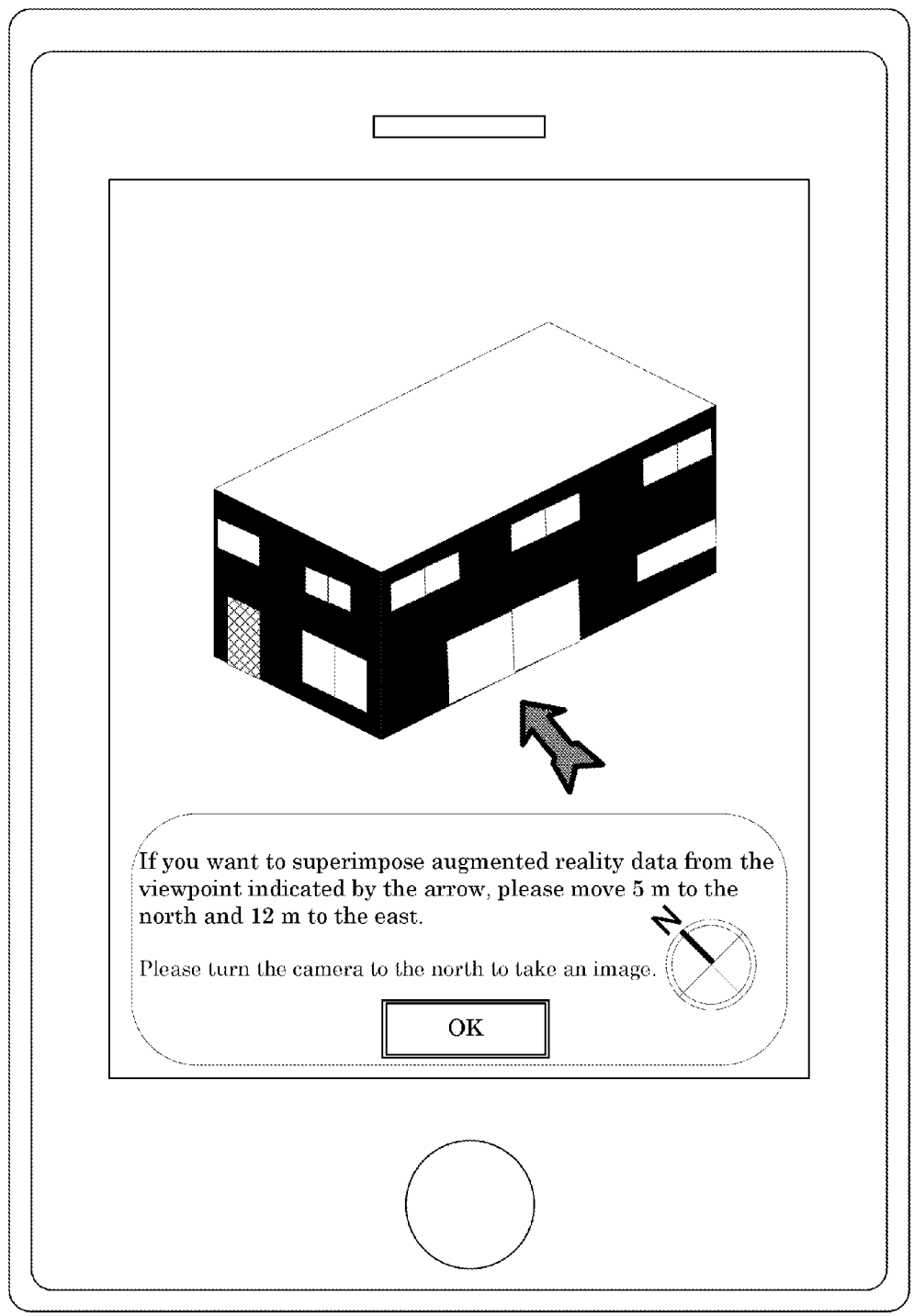
FIG. 11 shows one example of the direction data display screen in response to the instruction of FIG. 6.

FIG. 11 shows one example of the direction data output in response to the instruction data input of FIG. 6. The output unit 1200 of the photographer terminal 1000 displays the distance to the location at which an image is desired to be taken next time and the direction of the camera. The output unit 1200 also displays a compass to guide the user to the imaging direction.

Figure 12:
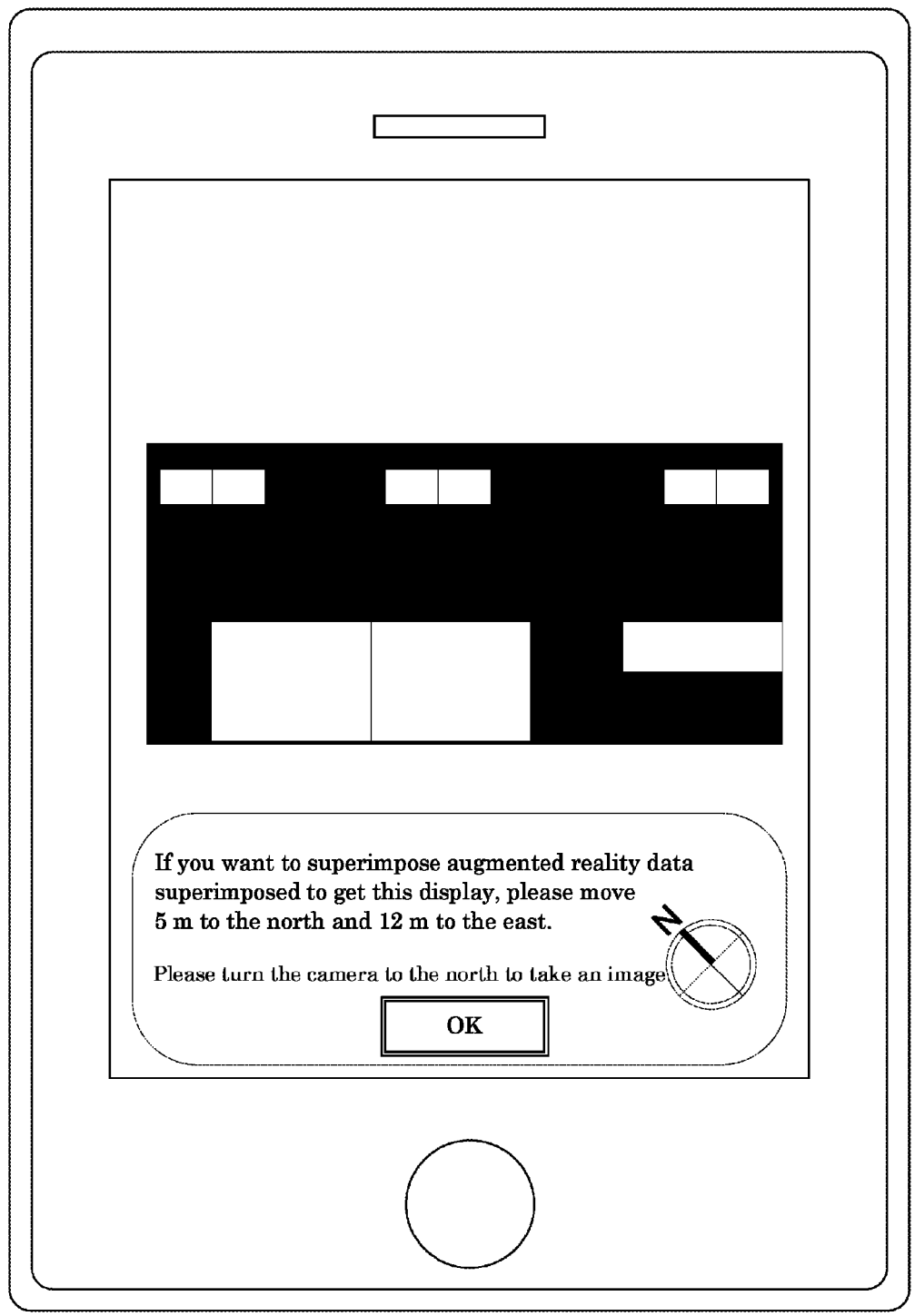
FIG. 12 shows one example of the direction data display screen in response to the instruction of FIG. 7.

FIG. 12 shows one example of the direction data output in response to the instruction data input of FIG. 7. The output unit 1200 of the photographer terminal 1000 displays the distance to the location at which an image is desired to be taken next time and the direction of the camera. The output unit 1200 also displays a compass to guide the user to the imaging direction.

Figure 13:
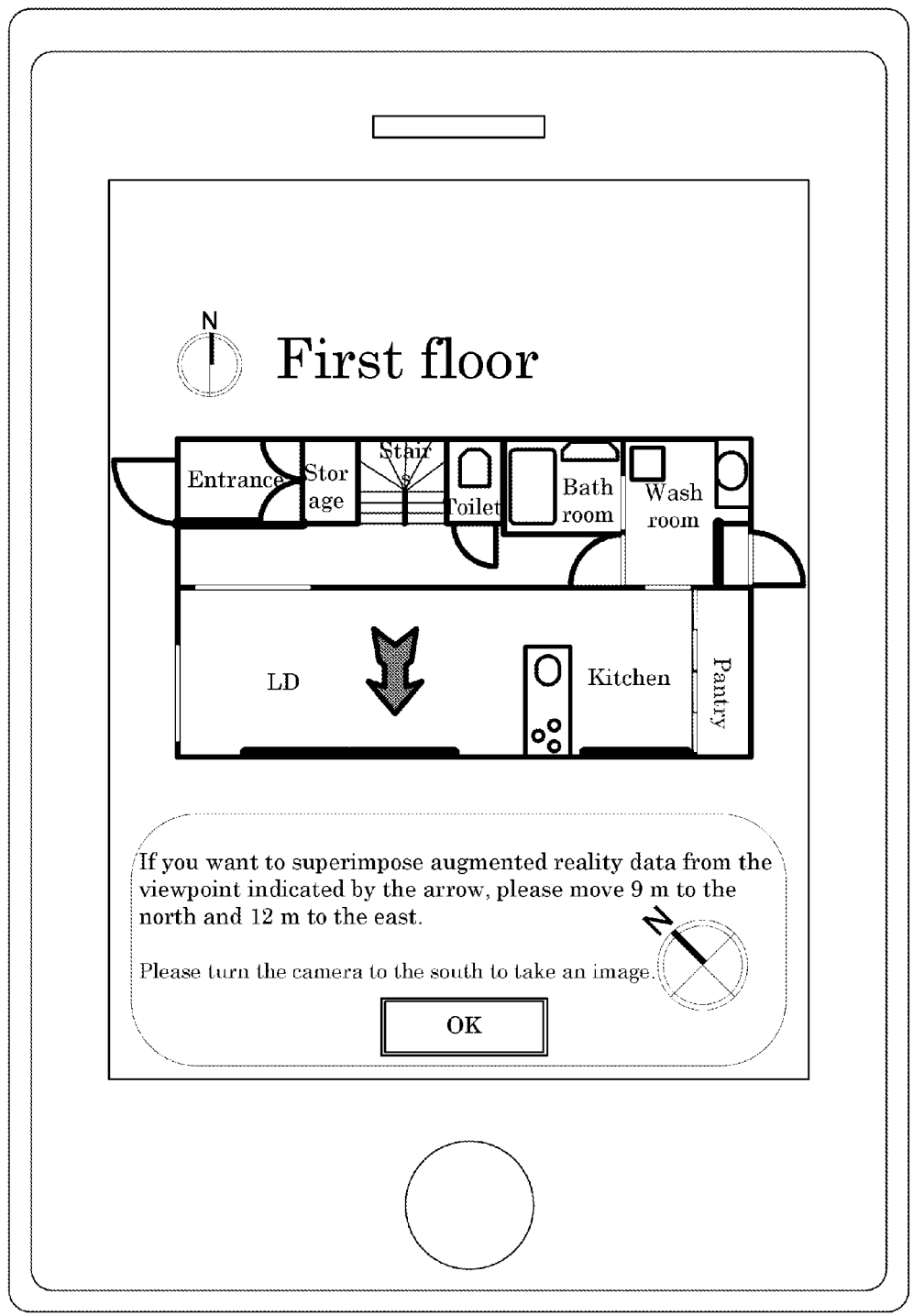
FIG. 13 shows one example of the direction data display screen in response to the instruction of FIG. 8.

FIG. 13 shows one example of the direction data output in response to the instruction data input of FIG. 8. The output unit 1200 of the photographer terminal 1000 displays the distance to the location at which an image is desired to be taken next time and the direction of the camera. The output unit 1200 also displays a compass to guide the user to the imaging direction.

These direction data can be hidden by selecting the OK button. When the photographer terminal 1000 moves from an imaging location, the direction data may be hidden because the distance to the location at which an image is desired to be taken next time is changed. In these cases, the compass may continue to be displayed.

When the photographer terminal 1000 moves from an imaging location or when the user specifies an imaging location, the navigation mode may be provided to guide the user to the location at which an image is desired to be taken next time so that the usability can be improved. The navigation mode is to be described later.

Functions

FIG. 2 shows a functional block diagram of the photographer terminal 1000 and the augmented reality server 2000 to illustrate the relationship among the functions. The photographer terminal 1000 is connected with the augmented reality server 2000 through a public line network 3000.

The photographer terminal 1000 includes an input unit 1100, an output unit 1200, an imaging unit 1300, a memory unit 1400, a communication unit 1500, and a control unit 1600. The photographer terminal 1000 may be a smart phone, a tablet PC, a digital camera, a wearable device, a security camera, or a general information appliance such as a PC provided with a camera function. The smart phone shown as the photographer terminal 1000 in the attached drawings is just one example.

The photographer terminal 1000 has a global positioning system (hereinafter referred to as "GPS") function, an electronic compass, an acceleration sensor, etc., that are necessary for generating location and direction data. The photographer terminal 1000 also has a map function to check the current location and the surrounding land features as well as the GPS function.

The input unit 1100 has the functions necessary to achieve an instruction data input module 1110 to input the above-mentioned instruction data. For example, the input unit 1100 may include a liquid crystal display to achieve a touch panel function, a key board, a mouse, a pen tablet, and a hardware button on the device, and a microphone to perform voice recognition. The features of the present invention are not limited in particular by an input method.

The output unit 1200 has the functions necessary to achieve a three-dimensional data display module 1210 to display the above-mentioned three-dimensional data and a direction data output module 1220 to output the above-mentioned direction data. For example, the output unit 1200 has a liquid crystal display, a PC display, and a projector. The output unit 1200 may also take various forms, for example, a speaker to output direction data by voice. The features of the present invention are not limited in particular by an output method.

The imaging unit 1300 includes a camera. The images that this camera takes can be converted into digital data and stored in the memory unit 1400 and displayed on the output unit 1200. The image may be a still image or a moving image. If the image is a moving image, the control unit 1600 can capture a part of the moving image to store in the memory unit 1400 as a still image. The obtained taken image is an accurate image with information as much as the system needs for augmented reality.

The memory unit 1400 includes a data storage unit such as a hard disk or a semiconductor memory. The memory unit 1400 can store the images that the imaging unit 1400 takes, the generated location and direction data, the three-dimensional data and the direction data that are received from the augmented reality server 2000, the instruction data input from the input unit 1100, and other information necessary for generating the data.

The communication unit 1500 communicates with the augmented reality server 2000 through a public line network 3000. The communication unit 1500 has functions necessary to achieve the transceiver modules such as a three-dimensional data receiving module 1510, a location and direction data transmitting module 1520, an instruction data transmitting module 1530, and a direction data receiving module 1540.

The control unit 1600 includes a central processing unit (hereinafter referred to as "CPU"), a random access memory (hereinafter referred to as "RAM"), and a read only memory (hereinafter referred to as "ROM"). The control unit 1600 achieves a location and direction data generation module 1610 in cooperation with the memory unit 1400.

The augmented reality server 2000 is a general one including a memory unit 2400, a communication unit 2500, and a control unit 2600. The memory unit 2400 includes a location matching database 2410.

The memory unit 2400 includes a data storage unit such as a hard disk or a semiconductor memory. The memory unit 2400 can store the location matching database, the location and direction data and the instruction data received from the photographer terminal 1000, the generated direction data, and other necessary information.

The communication unit 2500 communicates with the photographer terminal 1000 through a public line network 3000. The communication unit 2500 has functions necessary to achieve the transceiver modules such as a three-dimensional data transmitting module 2510, a location and direction data receiving module 2520, an instruction data receiving module 2530, and a direction data transmitting module 2540.

The control unit 2600 includes a central processing unit (hereinafter referred to as "CPU"), a random access memory (hereinafter referred to as "RAM"), and a read only memory (hereinafter referred to as "ROM"). The control unit 2600 achieves a direction data generation module 2610 in cooperation with the memory unit 2400.

Direction Data Output Process

Figure 3:
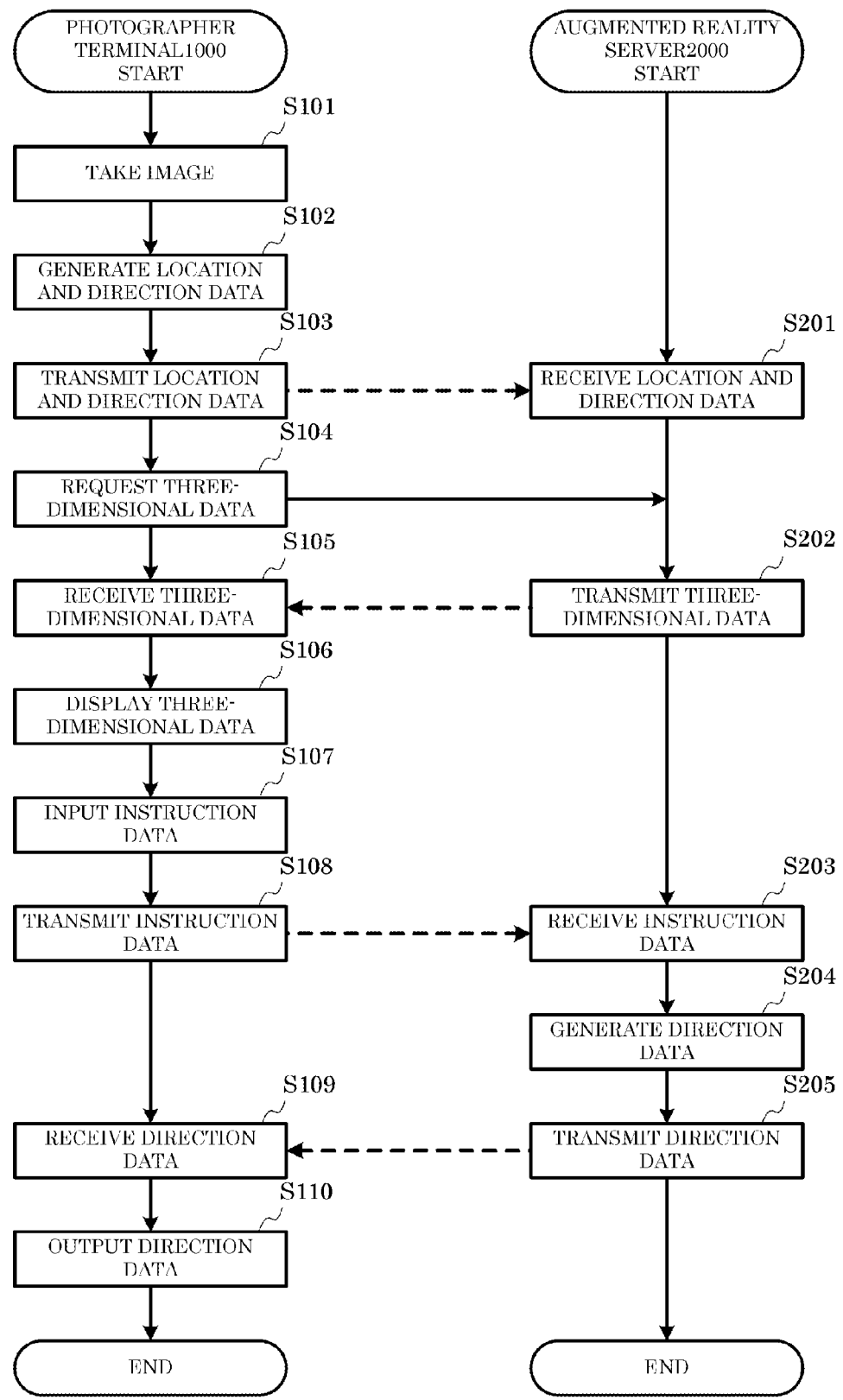
FIG. 3 shows a flow chart when the system including a photographer terminal 1000 and an augmented reality server 2000 outputs direction data.

FIG. 3 shows a flow chart when the system including a photographer terminal 1000 and an augmented reality server 2000 outputs direction data. The processes performed by the units and the modules of the above-mentioned device are explained below together with this process.

The photographer terminal 1000 executes an augmented reality program to display the three-dimensional data that displays buildings to be completed in a planned construction site where the building has not constructed yet. When executing the program, the photographer terminal 1000 is communicative with the augmented reality server 2000. If not communicative with the augmented reality server 2000, the photographer terminal 1000 cannot establish communication with the augmented reality server 2000. In this case, the output unit 1200 outputs that the augmented reality program cannot be executed.

When starting the augmented reality program, the photographer terminal 1000 preferably notifies the start to the augmented reality server 2000.

First, a user images a landscape including a planned construction site for a building by using the imaging unit 1300 of the photographer terminal 1000 (step S101).

Then, the location and direction data generation module 1610 of the control unit 1600 detects the location and the direction of the photographer terminal 1000 when an image is taken and generates the location and direction data (step S102). The location and the direction are detected with a global positioning system (hereinafter referred to as "GPS") function, an electronic compass, an acceleration sensor, etc., of the photographer terminal 1000.

Then, the photographer terminal 1000 transmits the location and direction data generated by the control unit 1600 to the augmented reality server 2000 through the location and direction data transmitting module 1520 of the communication unit 1500 (step S103).

The augmented reality server 2000 receives the location and direction data through the location and direction data receiving module 2520 of the communication unit 2500 (step S201).

The photographer terminal 1000 also requests the three-dimensional data from the augmented reality server 2000 (step S104).

If receiving a request for the three-dimensional data, the augmented reality server 2000 references the location matching database 2410 of the memory unit 2400 based on the location and direction data received in the step S201 to detect the three-dimensional data on the building. Then, the three-dimensional data on the building is transmitted to the photographer terminal 1000 through the three-dimensional data transmitting module 2510 of the communication unit 2500 (step S202).

In the step S202, the augmented reality server 2000 transmits not only the three-dimensional data on the building but also data on the latitude, the longitude, the direction of the front, etc., of the building if necessary to display augmented reality on the photographer terminal 1000.

If not detecting the three-dimensional data on the building, the augmented reality server 2000 may notify this to the photographer terminal 1000, and then the output unit 1200 of the photographer terminal 1000 may display that the building is not found, as an error.

Alternatively, the augmented reality server 2000 may transmit data on building names, etc., in the location matching database 2410, to the photographer terminal 1000, and then the output unit 1200 may output the data to allow a user to select a building desired to be displayed.

Still alternatively, the augmented reality server 2000 may transmit three-dimensional data on a building such as a model house whose actual location data are not registered, a miniature version of the building, etc., to the photographer terminal 1000, and then the output unit 1200 may output the data to allow a user to select a building desired to be displayed.

The photographer terminal 1000 receives the three-dimensional data from the augmented reality server 2000 through the three-dimensional data receiving module 1510 of the communication unit 1500 (step S105).

The photographer terminal 1000 then superimposes and displays the received three-dimensional data on the landscape imaged in the step S101 as augmented reality on the output unit 1200 through the three-dimensional data display module 1210 (step S106).

In the step S106, the three-dimensional data is displayed based on the data on the latitude, the longitude, the direction of the front, the altitude, etc., of the building that are received together with the three-dimensional data as appropriate.

If the data on the latitude, the longitude, the direction of the front, the altitude, etc., of the building does not exist or is not enough, the process to calculate the coordinate of each feature point based on corner points and local feature amounts in a background image, which is generally performed in markerless augmented reality, may be performed to display the three-dimensional data on the building to a potentially appropriate location as augmented reality.

Furthermore, the user may finely adjust the display location through the input unit 1100 after the three-dimensional data is displayed on the output unit 1200 of the photographer terminal 1000. This enables the correction of the errors caused by the GPS function.

The present invention is not the limited to the augmented reality method of superposing and displaying three-dimensional data on a landscape as a background. Various means of appropriate location adjustment are applicable.

If the user is satisfied with the displayed three-dimensional data, the augmented reality program is ended.

If desiring to image the landscape for displaying augmented reality to further check the three-dimensional data displayed by the user from other locations and angles, the user inputs instruction data on a location and a direction from which the user desires to view, through the instruction data input module 1110 of the input unit 1100 (step S107).

FIG. 6 shows one example of the screen to input an instruction of a location and a direction to the displayed three-dimensional data with an arrow. The user moves and turns the arrow around to input a location and an angle from which the user desires to check next time by the augmented reality program. In FIG. 6, only the building of three-dimensional data is displayed. However, the user may input instruction data in an augmented reality display in which the three-dimensional data is combined with the background. The user selects the confirm button when determining the location and the angle. The user selects the cancel button to cancel the input.

FIG. 7 shows one example of the screen to input an instruction of a location and a direction by rotating, and enlarging and reducing the displayed three-dimensional data. In this example, the user adjusts the three-dimensional data on the building by rotating, and enlarging and reducing it to obtain the location and the angle from which the user desires to actually view. FIG. 7 shows an example in which the front of the building is displayed from the short distance. The user selects the confirm button when the building that the user desires to view is displayed. The user selects the cancel button to cancel the input.

The users may desire to know how the landscape from the inside such as a living room window of the building is. Therefore, this system has a capability of receiving an input of instruction data when the outside is seen from the inside of a building, which is not shown in the drawings. The three-dimensional data for walk-through in the inside of a building is prepared in the location matching database 2410 of the augmented reality server 2000. In this case where the outside is seen from the inside of a building, the landscape only has to be displayed in a window of the building as virtual reality.

In this case where the outside is seen from the inside of a building, for example, the display shown in FIG. 7 is switched to the display of three-dimensional data on the inside of the building to perform walk-through in the building so that a location and an angle can be specified.

FIG. 8 shows one example of the screen to input instruction data on a location and a direction by using two-dimensional data corresponding to the displayed three-dimensional data. If the user hardly specifies the location and the angle that the user desires to check due to the system requirement, the user operability, etc., by operating the walk-through screen of the inside of the building, the display may be switched to two-dimensional data such as a floor plan corresponding to the three-dimensional data to allow the user to specify the location and the angle like an example shown in FIG. 8. This enables the user to clearly and easily specify the viewpoint, etc., including a large window.

Then, the photographer terminal 1000 transmits the input instruction as to a location and an angle to the augmented reality server 2000 through the instruction data transmitting module 1530 of the communication unit 1500 as instruction data (step S108).

The instruction data contains the location and the angle on three-dimensional data and on the two-dimensional drawing such as the floor plan, and the instructed date and time. However, the instruction data contain information, regardless of the data format of the location and the angle, enough for the server 2000 to generate direction data.

The augmented reality server 2000 receives the instruction data through the instruction data receiving module 2530 of the communication unit 2500 (step S203).

In the augmented reality server 2000, the control unit 2600 achieves a direction data generation module 2610 in cooperation with the memory unit 2400 to generate direction data (step S204).

The augmented reality server 2000 generates direction data based on the received instruction data, the data of the location matching database 2410 stored in the memory unit 2400, and the previously received current location and direction data of the photographer terminal 1000. The latitude, the longitude, the direction, etc., of the location at which the user desires to take an image next time can be calculated based on the instruction data, the three-dimensional data on the building, and the data on the latitude, the longitude, the direction, the altitude, etc., of the building.

The direction data indicates the distance from the current location at which the photographer terminal 1000 takes an image to the location specified as instruction data from which an image is desired to be taken next time. The direction data may also include the direction from which an image is desired to be taken.

The augmented reality server 2000 transmits direction data to the photographer terminal 1000 through the direction data transmitting module 2540 of the communication unit 2500 (step S205).

The photographer terminal 1000 receives the direction data through the direction data receiving module 1540 of the communication unit 1500 (step S109).

Finally, the output unit 1200 of the photographer terminal 1000 outputs the direction data indicating the distance to the location at which an image is desired to be taken next time and the direction, the angle, etc., of the camera when it takes an image, through the direction data output module 1220 (step S110).

FIG. 11 shows one example of the direction data display screen in response to the instruction of FIG. 6. The output unit 1200 of the photographer terminal 1000 displays the distance to the location at which an image is desired to be taken next time and the direction of the camera. The output unit 1200 also displays a compass to guide the user to the imaging direction.

FIG. 12 shows one example of the direction data display screen in response to the instruction of FIG. 7. The output unit 1200 of the photographer terminal 1000 displays the distance to the location at which an image is desired to be taken next time and the direction of the camera. The output unit 1200 also displays a compass to guide the user to the imaging direction.

FIG. 13 shows one example of the direction data display screen in response to the instruction of FIG. 8. The output unit 1200 of the photographer terminal 1000 displays the distance to the location at which an image is desired to be taken next time and the direction of the camera. The output unit 1200 also displays a compass to guide the user to the imaging direction.

When detecting not only the north, south, east, and west directions but also an inclination to the horizontal direction unlike FIG. 11, 12, or 13, the photographer terminal 1000 can also display how much the photographer terminal 1000 should be inclined to take an image.

These direction data can be hidden by selecting the OK button. When the photographer terminal 1000 moves from an imaging location, the direction data may be hidden because the distance to the location at which an image is desired to be taken next time is changed. In these cases, the compass may continue to be displayed.

When the photographer terminal 1000 moves from an imaging location or when the user specifies an imaging location, after the direction data is displayed, the navigation mode may be provided to guide the user to the location at which an image is desired to be taken next time so that the usability can be improved. The navigation mode is to be described later.

Figure 14:
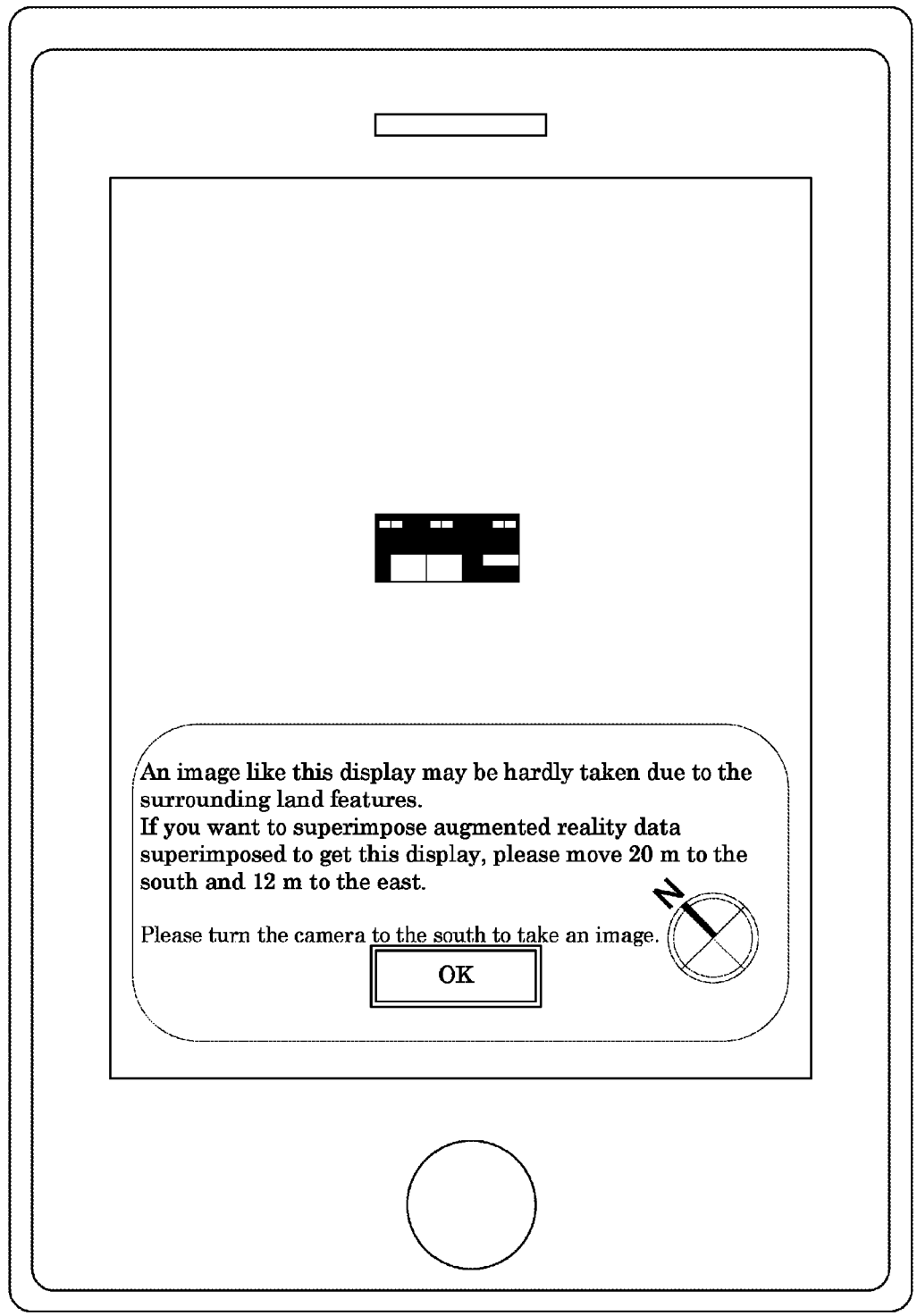
FIG. 14 shows one example of the direction data display screen if images are hardly taken under the instruction of FIG. 6

FIG. 14 shows one example of the direction data display screen if images are hardly taken under the instruction of FIG. 6. For example, if a location too far away from the building is specified as instruction data, no images may be taken from the location under the circumstance of the surrounding buildings and land features. In this case, the output unit 1200 of the photographer terminal 1000 outputs that images are hardly taken as shown in FIG. 14 to improve the usability.

The photographer terminal 1000 or the augmented reality server 2000 may judge whether or not images are hardly taken based on GPS data, surrounding map data, and necessary data such as latitude, longitude, altitude, and land features.

Location and Direction Data

FIG. 4 shows one example of location and direction data. The photographer terminal 1000 associates and generates data on the location and the direction such as the latitude, the longitude, the direction, and then the altitude with an imaged date and time as location and direction data.

The data format of the latitude, the longitude, the direction, and the altitude may be adjusted to a GPS log data standard or the digital still camera image file format standard (Exif) and only has to be adjusted depending on the system.

In FIG. 4, the direction and the altitude are based on true bearing and ordnance datum, respectively. However, the present invention is not limited to this in particular. For example, the direction and the altitude may be delivered based on magnetic bearing and vertical datum, respectively, which only have to be based on a standard appropriate for the system.

When the photographer terminal 1000 has a six-axis sensor, etc., unlike FIG. 4, to detect not only the north, south, east, and west directions but also an inclination to the horizontal direction, the location and direction data may include the inclination data. The inclination can generate more suitable direction data if the building is desired to be imaged from the bottom. In this case, the instruction data and the direction data may contain the inclination data. This can also present the imaging angle to the horizontal direction to the user.

Location Matching Database

FIG. 5 shows one example of data stored in the location matching database 2410. The location matching database 2410 associates and stores the three-dimensional data and the actual location of the building.

The data include the name of the building, drawing data such as CAD files, the type of the CAD, three-dimensional data necessary for augmented reality, the latitude and the longitude of the planned construction site for the building, and the direction of the front of the building. The altitude is not shown in FIG. 5 but may be included in the data.

The CAD to be used may have any types. If the type of the CAD is two-dimensional, the three-dimensional data only has to be prepared additionally. The drawing data such as CAD files or the type of CAD are not always needed. Three-dimensional data on the building that are necessary for augmented reality are only needed.

If the planned construction site for a building such as a model house is not specifically determined, the data such as the latitude, the longitude, the direction of the front, and the altitude of the building may be unnecessary. If such data other than three-dimensional data are insufficient, the user only has to specify the location of the three-dimensional data matched with the background image when the three-dimensional data is displayed on the photographer terminal 1000.

Direction Data

FIG. 9 shows one example of the direction data. This example contains the latitude, the longitude, the direction, and the altitude of the location at which an image is desired to be taken next time together with the date and time when the direction data was generated as information. In this example, the photographer terminal 1000 compares the location and direction data on the current location with the direction data to show the distance from the current location to the location from which an image is desired to be taken next time.

FIG. 10 shows another example of the direction data. This example contains the respective distances from the current location to the north, south, east, and west at which and the direction and the difference in altitude from which an image is desired to be taken next time together with the date and time when the direction data was generated as information. In this example, the augmented reality server 2000 compares the location and direction data on the current location of the photographer terminal 1000 with the data on the location at which an image is desired to be taken next time to calculate the distances and the difference in altitude as direction data.

Navigation Mode

Figure 15:
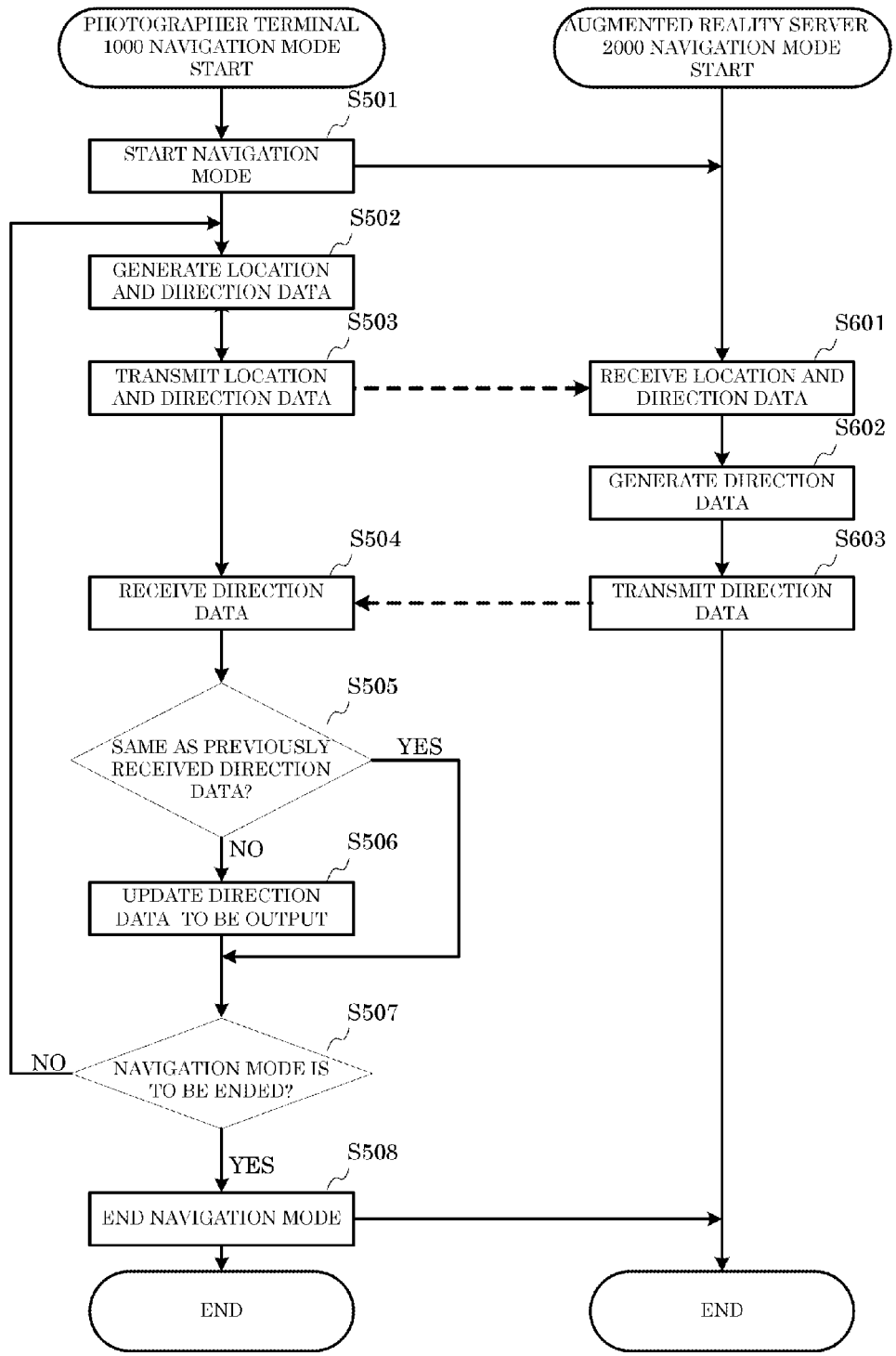
FIG. 15 shows a flow chart of the navigation to an imaging location after the direction data is output.

FIG. 15 shows a flow chart of the navigation to an imaging location at which an image is taken next time after the direction data is output. FIG. 16 shows one example of the display of direction data on the photographer terminal 1000 that is moved to an imaging location according to the navigation. The navigation mode will be explained below with reference to these figures.

To improve the usability, the navigation mode to guide the user to the location at which an image is desired to be taken next time may be provided. The navigation mode may be started by an instruction from the user or may automatically started by the setting if the movement of the photographer terminal 1000 is detected after the direction data is displayed.

If the navigation mode is started, the photographer terminal 1000 first notifies the start of the navigation mode to the augmented reality server 2000 (step S501).

The server 2000 detects that the photographer terminal 1000 enters the navigation mode, in response to receiving this notification, and stores information on the location at which and the direction from which an image is desired to be taken next time that are previously notified in the previous instruction data, in the memory unit 2400.

Then, the photographer terminal 1000 generates current location and direction data by using the location and direction data generation module 1610 (step S502). The location and direction data may be the same as those used in the direction data output process that is normally performed.

The photographer terminal 1000 transmits the generated location and direction data to the augmented reality server 2000 through the location and direction data transmitting module 1520 (step S503).

The augmented reality server 2000 receives the location and direction data through the location and direction data receiving module 2520 (step S601).

When receiving the location and direction data, the control unit 2600 achieves a direction data generation module 2610 in cooperation with the memory unit 2400 to generate direction data (step S602).

The direction data are generated based on the received location and direction data, the instruction data stored in the memory unit 2400 when the navigation mode is started, and the data of the location matching database 2410. The generated location and direction data may be the same as those used in the above-mentioned direction data output process.

The augmented reality server 2000 transmits direction data to the photographer terminal 1000 through the direction data transmitting module 2540 of the communication unit 2500 (step S603).

The photographer terminal 1000 receives the direction data through the direction data receiving module 1540 of the communication unit 1500 (step S504).

The photographer terminal 1000 checks whether or not the received direction data is the same as the previously received direction data (step S505).

If the received direction data is not the same as the previously received direction data, the photographer terminal 1000 updates the output data through the direction data output module 1220 of the photographer terminal 1000 (step S506).

If the received direction data is the same as the previously received direction data, the photographer terminal 1000 skips the direction data output update process of the step S506 and proceeds to the step S507.

In the step S507, the photographer terminal 1000 checks whether or not to end the navigation mode. Specifically, the photographer terminal 1000 checks whether or not the navigation end button, the imaging button, or the cancel button on the direction data screen shown in FIG. 16 is selected.

If none of these buttons have been selected, the process returns to the step S502 to continue in the navigation mode. If the loop of this flow chart is fast enough to burden the display and the processing, a waiting time may be inserted.

If any one of the buttons is pressed to end the navigation mode, the photographer terminal 1000 notifies the end of the navigation mode to the augmented reality server 2000 (step S508).

In this embodiment, one example flow of the navigation mode is described. However, the present invention is not limited to this flow. The technology, etc., generally used for the walking navigation system, etc., is appropriately applicable.

FIG. 16 shows one example of the display of direction data on the photographer terminal 1000 that is moved to an imaging location according to the navigation. This example is expressed in text when instruction data is input by using the arrow as shown in the examples of FIGS. 6 and 8.

The direction display 1 shows that the user should move 5 m to the north and 12 m to the east to get the place at which an image is desired to be taken next time that is specified in the instruction data and then turn the camera to the north to take an image.

The direction display 2 after the user moves 6 m to the north and 7 m to the east shows that the user should move to further move 1 m to the south and 5 m to the east to get the place at which an image is desired to be taken next time that is specified in the instruction data and then turn the camera to the north to take an image.

The direction display 3 after the user further moves 1 m to the south and 5 m to the east shows that the user only has to take an image at this location and that it is necessary to turn the camera to the north.

The direction display 4 after the camera is turned to the north at this same location shows that the camera has turned to the north and that the user only has to take an image from this location.

In this embodiment, one example of the display of direction data on the photographer terminal 1000 that is moved to an imaging location according to the navigation is described. However, the present invention is not limited to this example. The user only has to be appropriately guided to take an image from an imaged location. When the output unit 1200 of the photographer terminal 1000 includes a voice output function, the audio guidance can be performed.

The embodiments of the present invention are described above. However, the present invention is not limited to the above-mentioned embodiments. The effect described in the embodiments of the present invention is only the most preferable effect produced from the present invention. The effects of the present invention are not limited to that described in the embodiments of the present invention.

REFERENCE SIGNS LIST

1000 Photographer terminal
2000 Augmented reality server
3000 Public line network

What is claimed is:

1. A system for augmented reality, comprising a photographer terminal that displays augmented reality when taking an image and an augmented reality server being communicatively connected with the photographer terminal, wherein the photographer terminal includes:
   a location and direction data generation unit that detects current location information and a current direction and generates location data and direction data;
   a location and direction data transmitting unit that transmits the generated location data and direction data to the augmented reality server;
   a three-dimensional data receiving unit that receives three-dimensional data from the augmented reality server;
   a three-dimensional data display unit that displays the three-dimensional data;
   an instruction data input unit that receives an input of instruction data on a location and a direction to the displayed three-dimensional data from a user; and
   an instruction data transmitting unit that transmits the received instruction data to the augmented reality server, and the augmented reality server includes:
   a three-dimensional data transmitting unit that transmits the three-dimensional data in response to a request from the photographer terminal;
   a location and direction data receiving unit that receives the location data and the direction data from the photographer terminal;
   a location matching database that associates and stores the three-dimensional data with an actual location;
   an instruction data receiving unit that receives the instruction data from the photographer terminal; and
   a direction data transmitting unit that transmits direction data on the location and the direction of a camera to display augmented reality from the location and the direction contained in the instruction data received from the photographer terminal, based on the instruction data, the location matching database, and the location data and the direction data of the photographer terminal.

2. The system according to claim 1, wherein the photographer terminal further includes a direction data display unit that receives and displays the direction data transmitted from the direction data transmitting unit.

3. A method system for augmented reality that is executed by a system including a photographer terminal that displays augmented reality when taking an image and an augmented reality server that includes a location matching database that associates and stores the three-dimensional data with an actual location, the augmented reality server being communicatively connected with the photographer terminal,
   the method comprising the steps, executed by the photographer terminal, of:
      detecting current location information and a current direction and generating location data and direction data;
      transmitting the generated location data and direction data to the augmented reality server;
      receiving three-dimensional data from the augmented reality server;
      displaying the three-dimensional data;
      receiving an input of instruction data on a location and a direction to the displayed three-dimensional data from a user; and
      transmitting the received instruction data to the augmented reality server, and
   the steps, executed by the augmented reality server, of:
      transmitting the three-dimensional data in response to a request from the photographer terminal;
      receiving the location data and the direction data from the photographer terminal;
      receiving the instruction data from the photographer terminal; and
      transmitting direction data on the location and the direction of a camera to display augmented reality from the location and the direction contained in the instruction data received from the photographer terminal, based on the instruction data, the location matching database, and the location data and the direction data of the photographer terminal.

* * * * *